United States Patent
Wood

(10) Patent No.: US 11,096,111 B2
(45) Date of Patent: Aug. 17, 2021

(54) SYSTEM AND METHOD TO ASSIST IN ADDING NEW NODES TO WIRELESS RF NETWORKS

(71) Applicant: Silicon Laboratories Inc., Austin, TX (US)

(72) Inventor: Jake G. Wood, Boston, MA (US)

(73) Assignee: Silicon Laboratories, Inc., Austin, TX (US)

( * ) Notice: Subject to any disclaimer, the term of this patent is extended or adjusted under 35 U.S.C. 154(b) by 96 days.

(21) Appl. No.: 16/555,161

(22) Filed: Aug. 29, 2019

(65) Prior Publication Data

US 2021/0068035 A1 Mar. 4, 2021

(51) Int. Cl.
*H04W 48/08* (2009.01)
*H04W 12/04* (2021.01)
*H04L 12/28* (2006.01)
*H04L 12/24* (2006.01)

(52) U.S. Cl.
CPC ............ *H04W 48/08* (2013.01); *H04L 12/283* (2013.01); *H04L 41/0816* (2013.01); *H04W 12/04* (2013.01); *H04L 2012/2841* (2013.01)

(58) Field of Classification Search
CPC .... H04W 48/08; H04W 12/04; H04L 12/283; H04L 41/0816; H04L 2012/2841
See application file for complete search history.

(56) References Cited

U.S. PATENT DOCUMENTS

| | | | |
|---|---|---|---|
| 7,290,164 B1 * | 10/2007 | Harvey | H04L 41/0654 714/2 |
| 9,998,663 B1 * | 6/2018 | Francois | H04N 5/23238 |
| 2016/0142911 A1 * | 5/2016 | Kreiner | H04W 48/18 370/328 |
| 2017/0289901 A1 * | 10/2017 | Kim | G06Q 20/306 |
| 2018/0199246 A1 * | 7/2018 | Cheung | H04W 12/04 |
| 2019/0178869 A1 * | 6/2019 | Morley | G01N 33/98 |
| 2021/0026518 A1 * | 1/2021 | Lewis | G06F 3/04842 |

* cited by examiner

*Primary Examiner* — Duc C Ho
(74) *Attorney, Agent, or Firm* — Nields, Lemack & Frame, LLC

(57) ABSTRACT

A system and method of allowing a new device to join an existing network are disclosed. The new device comprises a non-RF-based transmitter, such as a light, a speaker or haptic generator, which emits a sequence that can be received by a facilitator device that is already part of the network. The sequence contains the device specific information associated with the new device. This facilitator device may be a mobile phone, a tablet or other component. The facilitator device then provides this device specific information to the gateway. The gateway then uses this device specific information as it performs a joining process with the new device.

20 Claims, 4 Drawing Sheets

SYSTEM AND METHOD TO ASSIST IN ADDING NEW NODES TO WIRELESS RF NETWORKS

This disclosure describes systems and methods allowing new devices to join a wireless network.

BACKGROUND

The explosion of network connected devices has led to an increased use of smart networks, and particularly smart home networks.

These smart networks may be any RF wireless network, including Thread, Zigbee, ZWave, Bluetooth, DotDot and others.

One issue associated with all of these networks is the need to provide security. The communications over each network should encrypted such that other listening devices cannot decode the network traffic. In other words, these devices must have a network key or password to allow them to decode encrypted communications over the network.

Typically, the network key is encrypted and transmitted over the network from the gateway to the joining node. In one scheme, the network key is encrypted using a well known security key, such as the default ZIGBEE® link key. However, this default key is well known. Thus, hackers or other malicious users can easily intercept the network key by observing traffic as a new device joins the network, thus allowing them to decrypt all traffic occurring over a network that uses the default key.

The second scheme is to encrypt the network key using a device-specific key. Unfortunately, this device-specific key must be communicated to the gateway. Currently, this is done by providing an indication of the key at the device. For example, a slip of paper with the device-specific key may be placed in the shipping box with the device. Alternatively, a QR code may be placed in the shipping box with the device. The user must then locate this indication and provide that device key to the gateway. The possibility of losing this key is high. Further, this solution presents a logistical problem for the device supplier since the indication must accompany the device through the manufacturing process.

Therefore, an improved system and method of allowing a new device to securely join a network is needed. Further, it would be beneficial if this system and method was simple to implement so as to be easily accomplished by novice users.

SUMMARY

A system and method of allowing a new device to join an existing network are disclosed. The new device comprises a non-RF-based transmitter, such as a light, a speaker or haptic generator, which emits a sequence that can be received by a facilitator device that is already part of the network. The sequence contains the device specific information associated with the new device. This facilitator device may be a mobile phone, a tablet or other component. The facilitator device then provides this device specific information to the gateway. The gateway then uses this device specific information as it performs a joining process with the new device.

According to one embodiment, a method of allowing a joining device to join a network, wherein a gateway and a facilitator device are part of the network, is disclosed. The method comprises transmitting from the joining device, a sequence containing device specific information associated with the joining device, wherein the joining device utilizes a non-RF-based transmitter to transmit the sequence; receiving, at the facilitator device, the sequence; transmitting a packet from the facilitator device to the gateway, wherein the packet contains the device specific information of the joining device; and performing a joining process between the gateway and the joining device using the network, wherein the device specific information from the joining device is used in the joining process. In certain embodiments, the device specific information comprises an installation code. In some embodiments, the joining device comprises a light source, the joining device transmits the device specific information by actuating the light source, and the facilitator device utilizes a camera to receive the sequence. In some embodiments, the joining device comprises a speaker, the joining device transmits the device specific information by actuating the speaker, and the facilitator device utilizes a microphone to receive the sequence. In some embodiments, the joining device comprises a haptic generator, the joining device transmits the device specific information by actuating the haptic generator and the facilitator device utilizes an accelerometer or a microphone to receive the sequence. In some embodiments, the joining device comprises a motor, the joining device transmits the device specific information by actuating the motor and the facilitator device utilizes an accelerometer or a camera to receive the sequence.

According to another embodiment, a method of allowing a joining device to join a network, wherein a gateway is part of the network, is disclosed. The method comprises transmitting from the joining device, sequence containing device specific information associated with the joining device, wherein the joining device utilizes a non-RF-based transmitter to transmit the sequence; receiving, at the gateway, the sequence; and performing a joining process between the gateway and the joining device using the network, wherein the device specific information from the joining device is used in the joining process. In certain embodiments, the device specific information comprises an installation code. In some embodiments, the joining device comprises a light source, the joining device transmits the device specific information by actuating the light source, and the gateway utilizes a camera to receive the sequence. In some embodiments, the joining device comprises a speaker, the joining device transmits the device specific information by actuating the speaker, and the gateway utilizes a microphone to receive the sequence. In some embodiments, the joining device comprises a haptic generator, the joining device transmits the device specific information by actuating the haptic generator and the gateway utilizes an accelerometer or a microphone to receive the sequence. In some embodiments, the joining device comprises a motor, the joining device transmits the device specific information by actuating the motor and the gateway utilizes an accelerometer or a camera to receive the sequence.

According to another embodiment, a system for allowing a device to easily join a network is disclosed. The system comprises a joining device, wherein the joining device comprises: a network interface to communicate using the network; a non-RF-based transmitter; a processing unit; and a memory in communication with the processing unit, wherein the memory comprises instructions, which when executed by the processing unit, enable the joining device to transmit a sequence using the non-RF-based transmitter, wherein the sequence comprises device-specific information; a facilitator device, comprising: a network interface to communicate using the network; a non-RF-based receiver; a processing unit; and a memory in communication with the processing unit, wherein the memory comprises instructions, which when executed by the processing unit, enable the facilitator device to: receive a sequence from the joining device using the non-RF-based receiver; and transmit a packet to a gateway using the network interface, wherein the packet contains the device-specific information obtained from the sequence; and the gateway, comprising: a network interface to communicate using the network; a processing unit, and a memory in communication with the processing unit, wherein the memory comprises instructions, which when executed by the processing unit, enable the gateway to: receive the packet from the facilitator device using the network interface; and participate in a joining process with the joining device using the network interface, wherein the device-specific information is used during the joining process. In some embodiments, the non-RF-based transmitter comprises a light source and the non-RF-based receiver comprises a camera. In some embodiments, the non-RF-based transmitter comprises a speaker and the non-RF-based receiver comprises a microphone. In some embodiments, the non-RF-based transmitter comprises a haptic generator and the non-RF-based receiver comprises a microphone or an accelerometer. In some embodiments, the non-RF-based transmitter comprises a motor and the non-RF-based receiver comprises a camera or an accelerometer. In certain embodiments, the gateway and the facilitator device are part of the network prior to the sequence being transmitted by the joining device. In certain embodiments, the memory in the joining device comprises instructions, which when executed by the processing unit, enable the joining device to transmit metadata to the facilitator device using the non-RF-based transmitter. In some embodiments, the joining process comprises transmitting a network key from the gateway to the joining device using the network interface, wherein the network key is encrypted using the device-specific information.

BRIEF DESCRIPTION OF THE DRAWINGS

For a better understanding of the present disclosure, reference is made to the accompanying drawings, in which like elements are referenced with like numerals, and in which.

DETAILED DESCRIPTION

According to one embodiment, the system and method described herein typically involve three devices; the new device that wishes to join the network, also referred to as the joining device; a device that is currently on the network and is able to be in proximity of the joining device, also referred to as the facilitator device, and the gateway.

Figure 1:
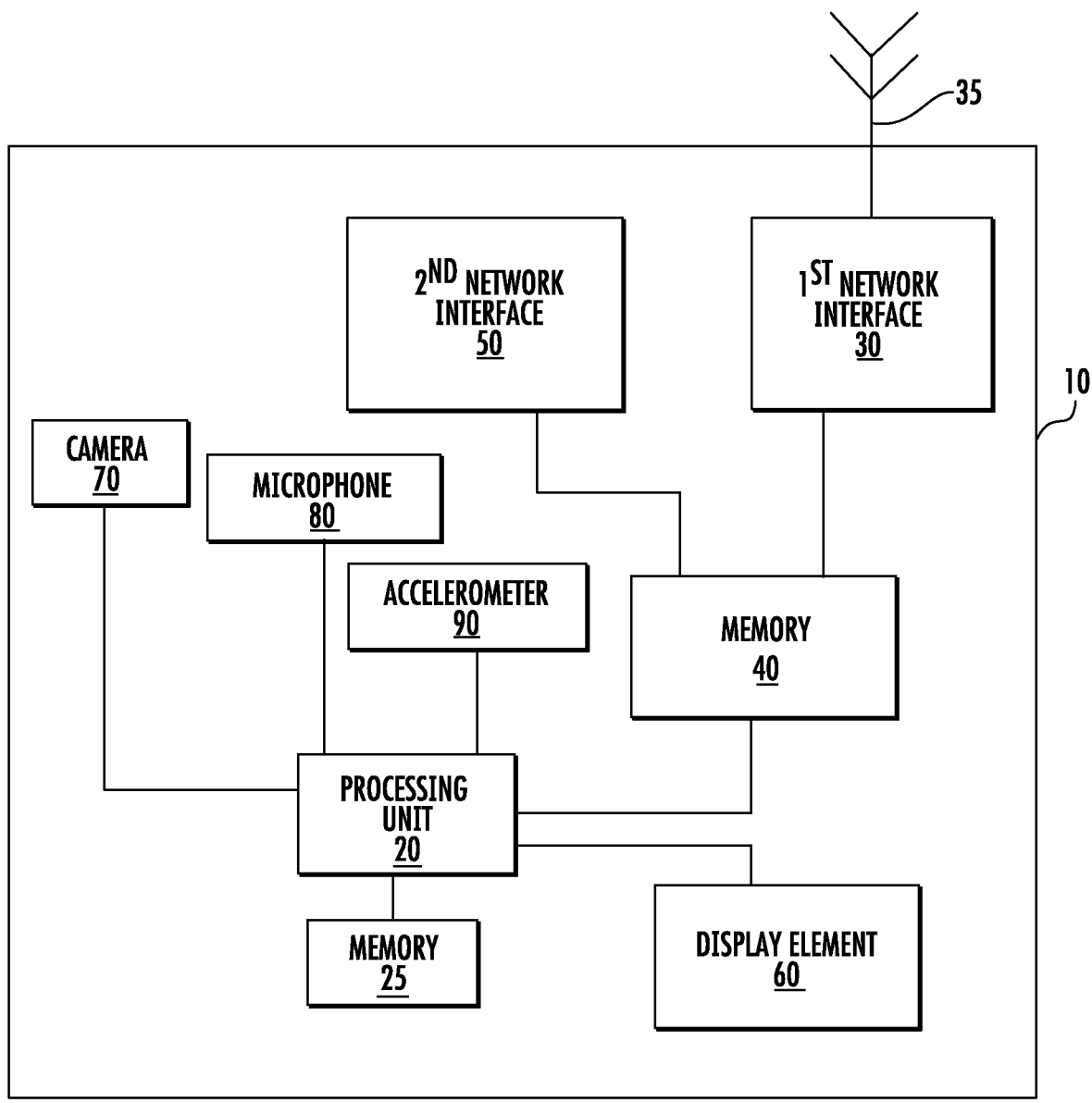
FIG. 1 is a block diagram of a network device that is part of the network.

The network may comprise a plurality of network devices. These network devices may be various types, such as door locks, lights, light switches, appliances, thermostats, phones, and personal computers. One of these network devices may be used to facilitate the joining process for a new device. FIG. 1 shows a block diagram of a representative facilitator device 10. In some embodiments, the facilitator device 10 may be a mobile device, such as a mobile phone or a tablet.

The facilitator device 10 has a processing unit 20 and an associated memory device 25. This memory device 25 contains the instructions, which, when executed by the processing unit 20, enable the facilitator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

The facilitator device 10 also includes a first network interface 30, which is typically a wireless interface including an antenna 35. The first network interface 30 may support any RF wireless network, including BLUETOOTH®, ZIGBEE®, ZWAVE, Thread, DotDot or others. This first network interface 30 is used to communicate over the network. In certain embodiments, the facilitator device 10 may include a second network interface 50, different from the first network interface 30. This second network interface 50 may support any wireless network, including WiFi, a cellular protocol, such as 3G, GCM, CDMA, 4G, LTE, or other protocols. However, the second network interface 50 is not required.

The facilitator device 10 may include a second memory device 40 in which data that is received by the first network interface 30, and data that is to be transmitted by the first network interface 30, is stored. Additionally, data sent and received by the second network interface 50 may be stored in the second memory device 40. This second memory device 40 is traditionally a volatile memory. The processing unit 20 has the ability to read and write the second memory device 40 so as to communicate with the other devices in the network. Although not shown, the facilitator device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and that language is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the facilitator device 10. The instructions contained on this second computer readable media may be downloaded onto the memory device 25 to allow execution of the instructions by the facilitator device 10.

The facilitator device 10 may also include a display element 60. In some embodiments, the display element 60 may be a LED or LCD screen. In certain embodiments, the display element 60 is a touch screen so that input may be supplied to the processing unit 20 through the display element 60. In other embodiments, the facilitator device 10 may also be in communication with a separate input device to allow user entry. The input device may be a keyboard, for example.

The facilitator device 10 includes at least one non-RF-based receiver. The non-RF-based receiver may be used to capture light, sound, movement or vibrations. For example, the facilitator device 10 may include a camera 70. The camera 70 may include a plurality of pixels that capture visual images. While the disclosure uses the term "camera", it is understood that any photodetector may be used. In some embodiments, the facilitator device 10 may include a microphone 80 to capture audio signals. The processing unit 20 is in communication with the camera 70 and the microphone 80 so as to be aware of any light or sounds. In other embodiments, the facilitator device 10 may include an accelerometer 90 that is able to detect motion.

In one specific embodiment, the facilitator device 10 may be a mobile telephone or tablet computer. In certain embodiments, the instructions described herein may be packaged as an application. The facilitator device 10 may receive the application from a remote server. For example, in one embodiment, an application may be made available on a remote server, such as a corporate server. In certain embodiments, the application may be available on a digital distribution platform, such as Google Play, Microsoft Store, the Apple App Store and others. Of course, in other embodiments, the software application may be pre-loaded onto the facilitator device 10.

Figure 2:
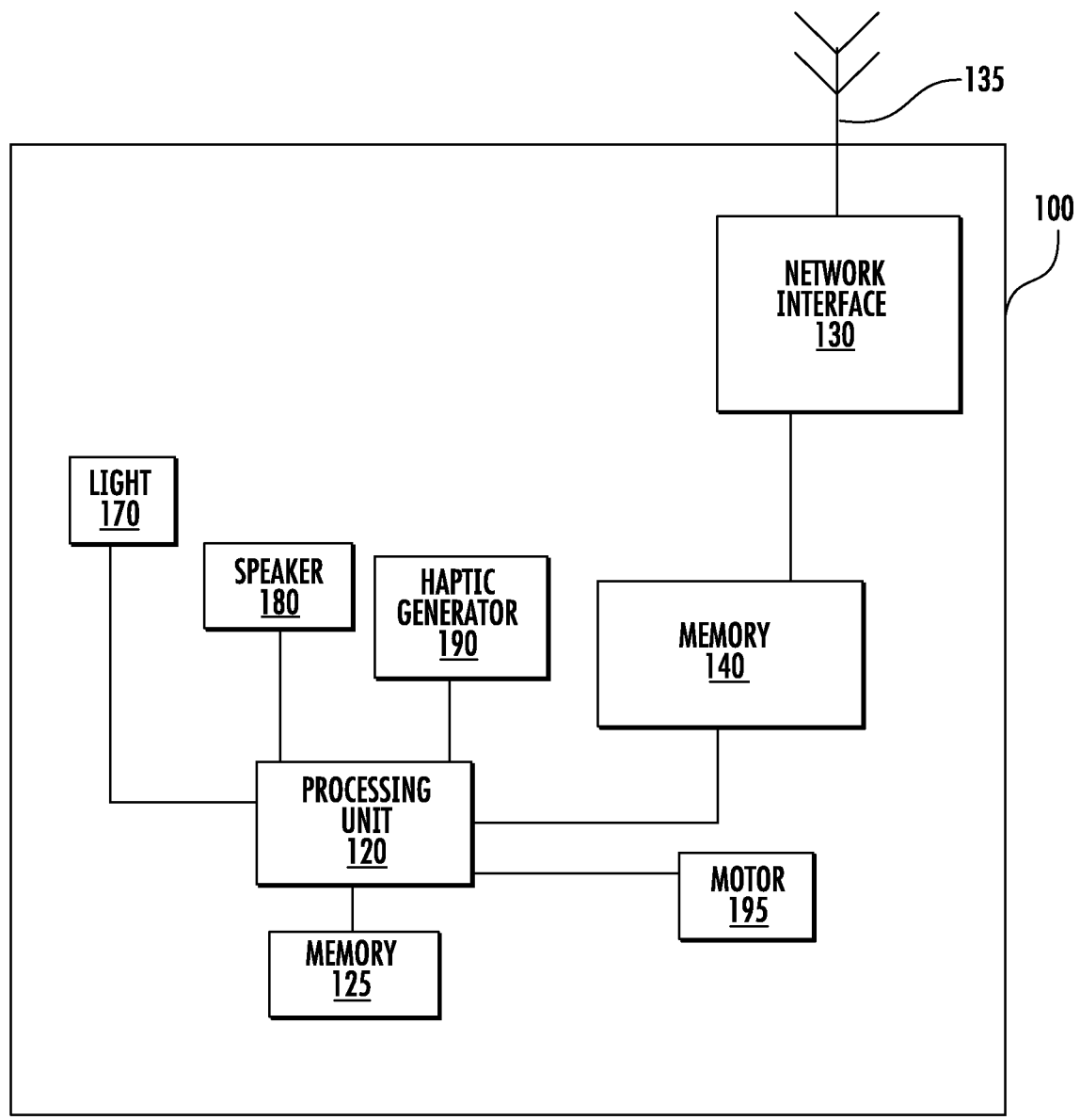
FIG. 2 is a block diagram of the new device that wishes to join the network.

FIG. 2 shows a represent schematic of the joining device 100. The joining device 100 has a processing unit 120 and an associated memory device 125. This memory device 125 contains the instructions, which, when executed by the processing unit 120, enable the joining device 100 to perform the functions described herein. This memory device 125 may be a non-volatile memory, such as a FLASH ROM, an electrically erasable ROM or other suitable devices. In other embodiments, the memory device 125 may be a volatile memory, such as a RAM or DRAM. In certain embodiments, the memory device 125 may be packaged with the processing unit 120. The processing unit 120 may be any suitable device, including but not limited to a general purpose processor, an application specific processor, an embedded controller, or a personal computer (PC).

The joining device 100 also includes a network interface 130, which is typically a wireless interface including an antenna 135. The network interface 130 may support any wireless RF network, including BLUETOOTH®, ZIGBEE®, Z-Wave, Thread, DotDot or other protocols.

The joining device 100 may include a second memory device 140 in which data that is received by the network interface 130, and data that is to be transmitted by the network interface 130, is stored. This second memory device 140 is traditionally a volatile memory. The processing unit 120 has the ability to read and write the second memory device 140 so as to communicate with the other devices in the network. Although not shown, the joining device 100 also has a power supply, which may be a battery or a connection to a permanent power source, such as a wall outlet.

While a memory device 125 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 125, such as for example, over a network connection (not shown), via CD ROM, or by another mechanism. These instructions may be written in any programming language and the language is not limited by this disclosure. Thus, in some embodiments, there may be multiple computer readable media that contain the instructions described herein. The first computer readable media may be in communication with the processing unit 120, as shown in FIG. 2. The second computer readable media may be a CDROM, or a different memory device, which is located remote from the joining device 100. The instructions contained on this second computer readable media may be downloaded onto the memory device 125 to allow execution of the instructions by the joining device 100.

The joining device 100 may also include a non-RF based transmission source. A non-RF-based transmission source is one which transmits signals from the joining device 100 without the use of radio frequency waves. One example of a non-RF-based transmission source is light source 170. The light source 170 may include one or more LEDs that emit light that can be seen outside the joining device 100. The light is emitted in the visible spectrum. In some embodiments, the joining device 100 may include a speaker 180 to emit audio signals. In certain embodiments, these audio sounds will fall in the human-audible spectrum of 20 Hz-20 kHz, as most commodity audio receivers are tuned to this range. In certain embodiments, the joining device 100 may include a motor 195 so that the joining device can physically change its position. In certain embodiments, the joining device 100 may include a haptic generator 190, such as a linear response actuator (LRA), a piezoelectric actuator, an eccentric rotating mass, or a magnetic haptic source, so as to create vibrations.

As stated above, the system may also include a gateway 200. The gateway 200 is part of the network 300 to which the joining device 100 wishes to join. The gateway 200 may be any device within the network 300, but is typically the device that is responsible for controlling access to the network 300. The gateway 200 may be different from the facilitator device 10. In these embodiments, the gateway 200 may have an architecture similar to that of the facilitator device 10. For example, the gateway 200 also includes a processing unit 220, a memory device 225, a second memory device 240, a first network interface 230, and an antenna 235, The first network interface 230 of the gateway 200, the first network interface 30 of the facilitator device 10, and the network interface 130 of the new joining device 100 utilize the same network protocol. The gateway 200 may include a more powerful processing unit and more memory than other network devices. Additionally, the gateway 200 may be connected to an electrical source, such as a wall outlet. Further, the gateway 200 may not include a camera, a microphone or an accelerometer.

Having described the physical configuration of these components, the method of using the facilitator device 10 to allow the joining device 100 to join network 300 will be described.

Traditionally, when a new device joins a network, the gateway needs to pass a network key to that device to allow the new device to be able to decrypt all communications occurring on that network. This network key must be transmitted over the network 300 to the joining device 100 by the gateway 200. However, simply sending the network key to the joining network device compromises the security of the network 300, as the network key is unencrypted. Therefore, if a hacker is monitoring network traffic, the network key can be readily captured and used to decrypt all other traffic on the network 300.

As an alternative, in some embodiments, the network key is transmitted using the network 300 to the joining device encrypted using a key. The key may be a default value, or a device unique value. In the case of a default value, the security of the network 300 is still compromised, as the default value of the link key is published and is well known. Thus, a hacker monitoring the traffic can decrypt the network key, since the link key is already known.

Consequently, the most secure approach is to create a key that is somehow unique to a particular joining device. This may be achieved by associating unique device specific information with each network device. This device specific information may accompany the network device when it is delivered to the customer. A novel method to transmit that device specific information from the joining device 100 to the gateway 200 is described below.

Figure 3:
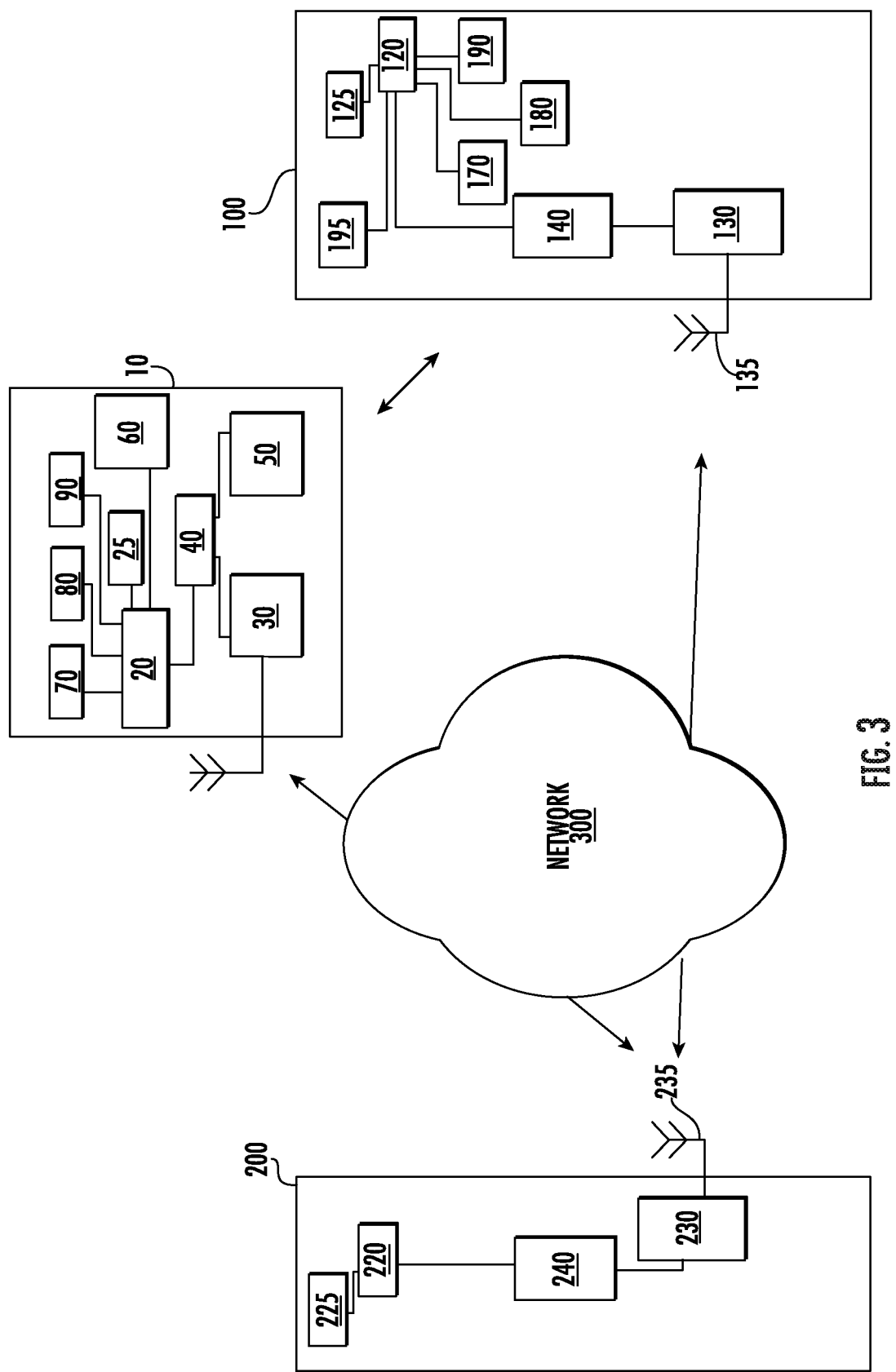
FIG. 3 shows a joining device, a gateway and the facilitator device during the joining process according to one embodiment.

FIG. 3 shows the components used for the joining process according to one embodiment. A facilitator device 10 is used to aid in the joining process but does not participate in the joining process. There is the joining device 100 that intends to join the network 300 and a gateway 200 that controls access to the network 300. The network 300 is typically a wireless RF network, such as ZIGBEE®, BLUETOOTH, DotDot, Thread or ZWave.

Rather than transmitting the device specific information over network 300, the joining device 100 initiates a sequence using a communication mechanism different from the protocol used by the network interface 130. In one particular embodiment, the joining device 100 includes a light source 170, such as one or more LEDs. In another embodiment, the joining device 100 includes a speaker 180. In yet another embodiment, the joining device 100 may include a motor 195 or a haptic generator 190.

The joining device 100 utilizes one or more of these components to transmit a unique sequence. For example, the joining device 100 may have device specific information that is stored in the memory device 125. As described above, the joining device 100 may transmit a sequence of visible light that contains the device specific information. Alternatively, the joining device 100 may transmit a sequence of audio signals that contains the device specific information. In another embodiment, the joining device 100 may include a motor 195 such that it is able to physically change its position. In this embodiment, the joining device 100 may execute a series of movements that are indicative of the device-specific information. In yet another embodiment, the joining device may include a haptic generator 190 such that the joining device 100 may create and transmit a series of vibrations. This series of vibrations may be indicative of the device-specific information.

This device specific information is unique to this joining device 100. For example, this may be code that is programmed into the device at the time of manufacture.

To join the network, the device specific information in the joining device 100 must be transferred to the gateway 200. The gateway 200 then uses this device specific information during the joining device 100, which is conducted over the network 300. For example, the gateway 200 may use the device specific information to encrypt the network key when it is transmitted to the joining device 100.

In one embodiment, the joining device 100 transmits the device specific information using the light source 170. For example, the device specific information may be converted into a sequence of light pulses. In other words, the joining device 100 may actuate the light source 170 to create this sequence. The sequence may be transmitted at a predetermined frequency, such as 10 KHz or more so that it is not visible to humans in the vicinity, that is the light will simply appear to be on. The sequence may include a starter or synchronization sequence to denote the beginning of the device specific information, followed by the device specific information. The starter or synchronization sequence, encoding of the device specific information, and contents of the device specific information are not limited by this disclosure. For example, the device specific information may be transmitted using a simple scheme where a "1" denotes that the light is on and a "0" indicates that the light is off. In other embodiments, each digit may be represented as a symbol, such as is done with Morse code. In some embodiments, the device specific information is encoded such that there is a minimum and maximum number of consecutive "1"s and "0" s. In other embodiments, the light source 170 may be capable of transmitting different wavelengths, such that changing colors may be used to represent the information.

A similar technique may be utilized using the speaker 180. For example, a "1" may be represented by a tone using a first frequency. A "0" may be represented by a tone having a second frequency, different from the first. In certain embodiment, the frequencies may be selected so as not to be audible to humans. In other embodiments, the frequencies may be in audible spectrum to be accessible to commodity audio devices designed to transmit and receive human-audible sound. The frequencies and encoding are not limited by this disclosure. Starting or synchronization sequences needed for this audio approach are also not limited by this disclosure.

A similar technique may be utilized using the haptic generator 190. For example, the haptic generator 190 may vibrate at multiple frequencies. For example, a "1" may be represented by a vibration using a first frequency. A "0" may be represented by a vibration having a second frequency, different from the first. The frequencies and encoding are not limited by this disclosure. Starting or synchronization sequences needed for this haptic approach are also not limited by this disclosure.

In yet another embodiment, a similar technique may be utilized using a motor 195. For example, the motor 195 may cause the joining device 100 to move or rotate in a plurality of directions. For example, a "1" may be represented by a movement in a first direction. A "0" may be represented by a movement in a second direction, different from the first. The movements and encoding are not limited by this disclosure. Starting or synchronization sequences needed for this approach are also not limited by this disclosure.

Note that in these embodiments, the joining device 100, and particularly the processing unit 120, is actively engage in the transmission. In other words, the device-specific information is contained within the joining device 100 and the processing unit 120 executes instructions to transmit this information to the facilitator device 10, using a non-RF-based transmitter disposed on the joining device 100.

The joining device 100 transmits the device specific information using the non-RF-based transmitter, such as a light source 170, a speaker 180, a motor 195, a haptic generator 190 or other non-RF-based transmitter. This device specific information is captured by the facilitator device 10. Specifically, if the joining device 100 utilizes light source 170, the facilitator device 10 utilizes the camera 70 to capture the visual pattern. Similarly, if the joining device 100 utilizes the speaker 180, the facilitator device 10 utilizes the microphone 80 to capture the audio pattern. Thus, in certain embodiments, the joining device 100 emits audio and/or visual sequences which are captured by the facilitator device 10. As stated above, the device specific information is contained in this audio and/or visual sequence.

In another embodiment, when the joining device 100 utilizes a haptic generator 190, the facilitator device 10 may utilize the microphone 80 to capture the sounds associated with the vibrations emitted by the joining device 100. In another embodiment, the facilitator device 10 may be placed on the joining device 100 such that the accelerometer 90 is able to capture the vibration pattern emitted by the joining device 100.

In yet other embodiment, when the joining device 100 utilizes a motor 195 so as to move, the facilitator device 10 utilizes the camera 70 to capture the movements of the joining device. The facilitator device 10 may convert these movements into the device-specific information. In another embodiment, the facilitator device 10 may be placed on the joining device 100 such that the accelerometer 90 is able to capture its movements.

Once the facilitator device 10 has received the sequence, which is non-RF-based and may include audio, visual, haptic or movement, it can then decode the device specific information. The facilitator device 10 device can then forward this information to the gateway 200, using the network 300. This occurs securely, since the facilitator device 10 is already part of network 300.

The gateway 200 can then participate in a joining process with the joining device 100, using network 300. During that joining process, the network key may be encrypted using the device specific information.

Figure 4:
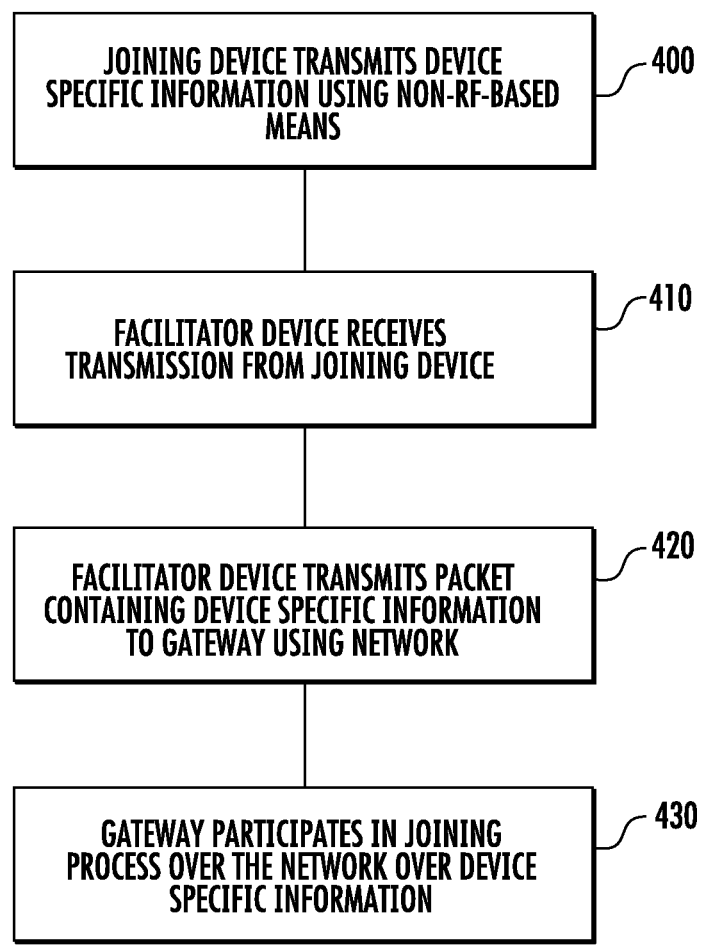
FIG. 4 shows a flowchart of the joining process.

FIG. 4 shows a flowchart illustrating the joining process according to one embodiment. In this embodiment, the joining device 100 begins transmitting its device specific information, as shown in Process 400. In certain embodiments, the joining device 100 begins transmitting the device specific information as soon as it is powered on. It may repeatedly transmit the device specific information for a predetermined amount of time or until it has joined a network. In another embodiment, the joining device 100 may be instructed to start transmitting the device specific information. For example, the joining device 100 may have an input that the user can access. Actuating this input may begin the transmission. For example, like WiFi access points, the joining device 100 may have a button that may be pressed by the user. Of course, other events may be used to initiate the transmission of the device specific information by the joining device 100. In another embodiment, the joining device may be controlled, such as through the use of a software application installed on another device. This software application may allow the user to instruct the joining device to start transmitting the device specific information. Of course, other techniques may be used to initiate the transmission of the device specific information. As stated above, the device specific information is transmitted using non-RF-based means.

The facilitator device 10 may be disposed in proximity to the joining device 100 so as to receive the sequence from the joining device 100. The facilitator device 10 is already a member of network 300.

As shown in Process 410, the facilitator device 10 receives the sequence transmitted by the joining device 100. As explained above, this sequence may be encoded by the joining device 100. If so, the facilitator device 10 decodes the sequence using the same encoding scheme.

As shown in Process 420, the facilitator device 10 then transmits a packet to the gateway 200 using the network 300. This packet contains the device specific information. Since the facilitator device 10 is already part of the network 300, this packet is encrypted and cannot be intercepted. This packet may be transmitted using a vendor unique command or a standard command.

This part of the sequence (i.e. Process 400-420) replaces the use of the default link key, the need to manually enter the device specific information into the gateway 200 or the use of a QR code.

Once the gateway 200 receives the packet from the facilitator device 10, the joining process between the gateway 200 and the joining device 100 can begin, as shown in Process 430. In certain embodiments, the joining process includes transmitting a packet from the gateway 200 to the joining device 100, where this packet contains the network key, encrypted using the device specific information. In another example, the device specific information may be used as part of an ECDH public or shared key to encode information being transmitted between the gateway 200 and the joining device 100. Of course, the joining process may have additional steps and the particular joining process is not limited by the disclosure. Rather, this disclosure provides a system and method to obtain the device specific information from a joining device and transmit that device specific information to the gateway 200, where this device specific information is used during the joining process.

Each device performs certain steps in this sequence. For example, the joining device 100 performs Process 400 and also participates in the joining process (Process 430). Therefore, the instructions contained within memory device 125 contain instructions that allow the joining device 100 to:
    transmit the device specific information using non-RF-based means; and
    participate in the joining process with the gateway using the network.

The facilitator device performs Processes 410-420. Therefore, the instructions contained within memory device 25 contain instructions that allow the facilitator device 10 to:
    receive the sequence transmitted by the joining device;
    decode the sequence to determine the device specific information; and
    transmit the device specific information to the gateway over the network.

Finally, the gateway performs Processes 420-430. Therefore, the instructions contained within memory device 225 contain instructions that allow the gateway 200 to:
    receive the packet containing the device specific information from the facilitator device over the network; and
    participate in the joining process with the joining device using the network.

The above disclosure refers to device specific information. It is noted that any unique information may be passed from the joining device 100 to the gateway 200 to be used to encrypt the network key. For example, the device specific information may include the joining node's ID or other metadata. Alternatively, the device specific information may be a Device-Specific Key (DSK). In another embodiment, the device specific information may be information that is currently provided by a QR code.

In addition to providing information that may be used for the joining process, the joining device 100 may transmit other information. For example, some basic device metadata can be exchanged for easier customer configuration. For instance, the joining device 100 may transmit basic information to indicate what kind of device it is. Specifically, if the user were to add a speaker to the network, the joining device 100 may transmit some basic metadata that indicates the device type. In this way, if a customer is using a software application to configure the joining device 100, the user interface on the facilitator device 10 may pop up with "Speaker Device 1" with a speaker icon, as opposed to "Network Device 1" with a question mark icon. This metadata makes configuration easier from a customer perspective, especially if the user is attempting to add multiple devices at once.

Additionally, it is noted that the above example utilizes a facilitator device 10 that is different from the gateway 200. However, in certain embodiments, the gateway 200 may have a camera or microphone and may act as both the facilitator device and the gateway 200. Thus, in certain embodiments, the joining process described above may be performed with two devices; the joining device 100 and the gateway 200, which also serves as the facilitator device 10. In these embodiments, the instructions contained within memory device 225 contain instructions that allow the gateway 200 to:

receive the sequence transmitted by the joining device;
decode the sequence to determine the device specific information; and
participate in the joining process with the joining device using the network.

The following describes a specific example of this system and method. Assume that a user has a smart home network with a central gateway and wishes to add a garage door opener to this network. Also assume that the user has configured his mobile phone or tablet as a member of this smart home network. This smart network may be ZIGBEE®, ZWAVE or some other wireless RF network that incorporates security.

The user may install the garage door opener. After this, the garage door opener is powered. At some time after power-up, the garage door opener may begin transmitting an audio, visual, haptic or motion-based sequence. For example, the garage door opener may have a separate LED specifically for this function. In another embodiment, the garage door opener may already include lights to illuminate the garage upon opening. The user then activates a software application on their mobile phone. This application enables the mobile phone to use its camera or microphone to capture the sequence and operate as the facilitator device. The software application in the mobile phone then decodes this sequence to obtain the device specific information, which may be an installation code, a node ID, a Device-Specific Key (DSK) or any other relevant information. The software application in the mobile phone then transmits a packet containing this device specific information to the gateway using the network.

Once the gateway has the device specific information, it can participate in the joining sequence with the garage door opener. Note that the user did not have to look for or utilize a QR code or other identifying information.

Importantly, the present system and method allows the transmission of the device specific information from the joining node to the gateway with minimal involvement of the user. Specifically, the user simply needs to install an application on their mobile device and execute that application in order to perform the joining process. Alternatively, this functionality may be embedded into the application previously installed on the smart phone which is already used to configure and control smart home devices. Note that the user is not required to manually enter any information into the gateway. Further, the user is not required to scan a QR code that accompanied the new device.

The ability to eliminate the QR code simplifies the manufacturing process in that the manufacturer no longer has to ensure that the correct QR code accompanies the device throughout the manufacturing process. It also makes it easier for the user to re-provision the device. In certain embodiments, the user must keep the QR code or the device cannot join any other networks. In this way, a facilitator device is always able to obtain the device specific information.

Further, the present system and method allow for increased security. Most of the non-RF-based transmissions described herein can only be received within line of sight/earshot. In contrast, RF communications can travel through walls for easier interception by a malicious actor. Additionally, QR codes/serial numbers can be peeked at by simply opening the box in the store that contains the new device. With non-RF-based transmissions, the device must be powered on, which is much more difficult for a malicious actor to do discreetly in a store.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of allowing a joining device to join a network, wherein a gateway and a facilitator device are part of the network, the method comprising:
transmitting from the joining device, a sequence containing device specific information associated with the joining device, wherein the joining device utilizes a non-RF-based transmitter to transmit the sequence;
receiving, at the facilitator device, the sequence;
transmitting a packet from the facilitator device to the gateway using the network, wherein the packet contains the device specific information of the joining device; and
performing a joining process between the gateway and the joining device using the network, wherein the device specific information from the joining device is used in the joining process.

2. The method of claim 1, wherein the device specific information comprises an installation code.

3. The method of claim 1, wherein the joining device comprises a light source, the joining device transmits the sequence containing device specific information by actuating the light source, and the facilitator device utilizes a camera to receive the sequence.

4. The method of claim 1, wherein the joining device comprises a speaker, the joining device transmits the sequence containing device specific information by actuating the speaker, and the facilitator device utilizes a microphone to receive the sequence.

5. The method of claim 1, wherein the joining device comprises a haptic generator, the joining device transmits the sequence containing device specific information by actuating the haptic generator and the facilitator device utilizes an accelerometer or a microphone to receive the sequence.

6. The method of claim 1, wherein the joining device comprises a motor, the joining device transmits the sequence containing device specific information by actuating the motor and the facilitator device utilizes an accelerometer or a camera to receive the sequence.

7. A method of allowing a joining device to join a network, wherein a gateway is part of the network, the method comprising:
   transmitting from the joining device, sequence containing device specific information associated with the joining device, wherein the joining device utilizes a non-RF-based transmitter to transmit the sequence;
   receiving, at the gateway, the sequence transmitted by the joining device; and
   performing a joining process between the gateway and the joining device using the network, wherein the device specific information from the joining device is used in the joining process.

8. The method of claim 7, wherein the device specific information comprises an installation code.

9. The method of claim 7, wherein the joining device has a light, the joining device transmits the sequence containing device specific information by actuating the light, and the gateway utilizes a camera to receive the sequence.

10. The method of claim 7, wherein the joining device has a speaker, the joining device transmits the sequence containing device specific information by actuating the speaker, and the gateway utilizes a microphone to receive the sequence.

11. The method of claim 7, wherein the joining device comprises a haptic generator, the joining device transmits the sequence containing device specific information by actuating the haptic generator and the gateway utilizes an accelerometer or a microphone to receive the sequence.

12. The method of claim 7, wherein the joining device comprises a motor, the joining device transmits the sequence containing device specific information by actuating the motor and the gateway utilizes an accelerometer or a camera to receive the sequence.

13. A system to allowing a device to easily join a network, comprising:
   a joining device, wherein the joining device comprises:
   a network interface to communicate using the network;
   a non-RF-based transmitter;
   a processing unit; and a memory in communication with the processing unit, wherein the memory comprises instructions, which when executed by the processing unit, enable the joining device to transmit a sequence using the non-RF-based transmitter, wherein the sequence comprises device-specific information;
   a facilitator device, comprising:
   a network interface to communicate using the network;
   a non-RF-based receiver;
   a processing unit; and a memory in communication with the processing unit, wherein the memory comprises instructions, which when executed by the processing unit, enable the facilitator device to:
   receive a sequence from the joining device using the non-RF-based receiver; and
   transmit a packet to a gateway using the network interface, wherein the packet contains the device-specific information obtained from the sequence and is transmitted using the network;
   and
   the gateway, comprising:
   a network interface to communicate using the network;
   a processing unit, and a memory in communication with the processing unit, wherein the memory comprises instructions, which when executed by the processing unit, enable the gateway to:
   receive the packet from the facilitator device using the network interface; and
   participate in a joining process with the joining device using the network interface, wherein the device-specific information is used during the joining process.

14. The system of claim 13, wherein the non-RF-based transmitter comprises a light source and the non-RF-based receiver comprises a camera.

15. The system of claim 13, wherein the non-RF-based transmitter comprises a speaker and the non-RF-based receiver comprises a microphone.

16. The system of claim 13, wherein the non-RF-based transmitter comprises a haptic generator and the non-RF-based receiver comprises a microphone or an accelerometer.

17. The system of claim 13, wherein the non-RF-based transmitter comprises a motor and the non-RF-based receiver comprises a camera or an accelerometer.

18. The system of claim 13, wherein the gateway and the facilitator device are part of the network prior to the sequence being transmitted by the joining device.

19. The system of claim 13, wherein the memory in the joining device comprises instructions, which when executed by the processing unit, enable the joining device to transmit metadata to the facilitator device using the non-RF-based transmitter.

20. The system of claim 13, wherein the joining process comprises transmitting a network key from the gateway to the joining device using the network interface, wherein the network key is encrypted using the device-specific information.

* * * * *